(12) United States Patent
Wang et al.

(10) Patent No.: US 9,886,433 B2
(45) Date of Patent: Feb. 6, 2018

(54) DETECTING LOGOGRAMS USING MULTIPLE INPUTS

(71) Applicant: LENOVO (Singapore) PTE, LTD., New Tech Park (SG)

(72) Inventors: Song Wang, Cary, NC (US); Ming Qian, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/882,016

(22) Filed: Oct. 13, 2015

(65) Prior Publication Data

US 2017/0103063 A1    Apr. 13, 2017

(51) Int. Cl.

| | | |
|---|---|---|
| *G06F 17/28* | (2006.01) |
| *G06F 17/27* | (2006.01) |
| *G06F 17/21* | (2006.01) |
| *G10L 15/00* | (2013.01) |
| *G10L 13/08* | (2013.01) |
| *G10L 21/06* | (2013.01) |
| *G10L 25/00* | (2013.01) |
| *G10L 21/00* | (2013.01) |
| *G06K 9/18* | (2006.01) |
| *G06K 9/00* | (2006.01) |
| *G06K 9/62* | (2006.01) |
| *G06F 3/033* | (2013.01) |
| *G06F 17/22* | (2006.01) |
| *G10L 15/02* | (2006.01) |
| *G06F 3/01* | (2006.01) |
| *G09G 5/08* | (2006.01) |
| *G06F 3/02* | (2006.01) |
| *G09G 5/00* | (2006.01) |
| *G06T 11/00* | (2006.01) |

(52) U.S. Cl.
CPC ............ *G06F 17/276* (2013.01); *G06F 3/018* (2013.01); *G06F 17/2223* (2013.01); *G10L 15/02* (2013.01)

(58) Field of Classification Search
CPC .............. G06F 17/289; G06F 17/2785; G06F 17/2735; G06F 17/273; G06F 3/018; G06F 3/0237; G06F 3/0482; G06F 3/03549; G06F 3/038; G10K 9/222; G10K 9/66; G10K 15/02; G10L 15/22; G10L 15/265; G10L 13/08; G10L 21/06
See application file for complete search history.

(56) References Cited

U.S. PATENT DOCUMENTS

| | | | | |
|---|---|---|---|---|
| 4,679,951 A | * | 7/1987 | King | B41J 3/01 345/168 |
| 5,741,136 A | * | 4/1998 | Kirksey | G09B 5/065 345/473 |
| 5,812,863 A | * | 9/1998 | Ishikawa | G06F 17/274 715/257 |
| 5,938,447 A | * | 8/1999 | Kirksey | G09B 5/065 348/589 |

(Continued)

*Primary Examiner* — Anne T Thomas-Homescu
(74) *Attorney, Agent, or Firm* — Kunzler PC (57) ABSTRACT

For detecting logograms using multiple inputs, code executable by a processor may detect a sub-logogram from a written input to a written input device, detect a pronunciation from an audio input to an audio input device, and display one or more logogram hints in response to detecting the sub-logogram and the pronunciation. Each logogram hint of the one or more logogram hints includes the sub-logogram.

14 Claims, 8 Drawing Sheets

(56) References Cited

U.S. PATENT DOCUMENTS

| | | | | |
|---|---|---|---|---|
| 6,005,549 A * | 12/1999 | Forest | G06F 3/011 | 345/157 |
| 6,062,863 A * | 5/2000 | Kirksey | G09B 5/065 | 434/167 |
| 6,411,948 B1 * | 6/2002 | Hetherington | G06F 17/2863 | |
| 6,415,258 B1 * | 7/2002 | Reynar | G06F 3/167 | 704/201 |
| 6,446,041 B1 * | 9/2002 | Reynar | G06F 3/167 | 704/235 |
| 6,539,113 B1 * | 3/2003 | Van Kleeck | G06K 9/6255 | 382/185 |
| 6,760,695 B1 * | 7/2004 | Kuno | G06F 17/271 | 704/2 |
| 7,099,876 B1 * | 8/2006 | Hetherington | G06F 17/2205 | |
| 7,149,970 B1 * | 12/2006 | Pratley | G06F 17/273 | 704/10 |
| 7,424,156 B2 * | 9/2008 | Huang | G06K 9/6293 | 382/179 |
| 8,997,018 B2 * | 3/2015 | Cheng | G06F 3/0482 | 715/810 |
| 9,317,870 B2 * | 4/2016 | Tew | G06F 3/0482 | |
| 9,436,781 B2 * | 9/2016 | Gibbs | G06F 17/276 | |
| 9,443,035 B2 * | 9/2016 | Gibbs | G06F 17/276 | |
| 2002/0152075 A1 * | 10/2002 | Kung | G06F 3/0488 | 704/270 |
| 2003/0212563 A1 * | 11/2003 | Ju | G06F 3/018 | 704/277 |
| 2004/0236581 A1 * | 11/2004 | Ju | G10L 15/063 | 704/276 |
| 2005/0102138 A1 * | 5/2005 | Mao | G10L 15/24 | 704/231 |
| 2005/0289173 A1 * | 12/2005 | Vacca | G06Q 50/22 | |
| 2006/0106769 A1 * | 5/2006 | Gibbs | G06F 17/276 | |
| 2006/0167872 A1 * | 7/2006 | Parikh | G06F 3/0237 | |
| 2006/0200442 A1 * | 9/2006 | Parikh | G06F 17/30648 | |
| 2007/0162445 A1 * | 7/2007 | Scriffignano | G06F 17/30587 | |
| 2007/0203746 A1 * | 8/2007 | DeHaan | G06Q 50/22 | 705/2 |
| 2008/0196144 A1 * | 8/2008 | Ruiz | A42B 1/043 | 2/171 |
| 2008/0211777 A1 * | 9/2008 | Li | G06F 17/2223 | 345/171 |
| 2008/0215307 A1 * | 9/2008 | Li | G06F 17/2863 | 704/3 |
| 2008/0215308 A1 * | 9/2008 | Li | G06F 3/04883 | 704/3 |
| 2008/0221890 A1 * | 9/2008 | Kurata | G10L 15/063 | 704/251 |
| 2008/0312911 A1 * | 12/2008 | Zhang | G06F 17/2735 | 704/10 |
| 2009/0055381 A1 * | 2/2009 | Wu | G06F 17/2745 | |
| 2009/0228832 A1 * | 9/2009 | Cheng | G06F 3/0482 | 715/810 |
| 2010/0005086 A1 * | 1/2010 | Wang | G06F 3/018 | 707/E17.014 |
| 2010/0017369 A1 * | 1/2010 | Park | G06F 17/2223 | 707/E17.014 |
| 2010/0141584 A1 * | 6/2010 | Griffin | G06F 3/018 | 345/167 |
| 2010/0246964 A1 * | 9/2010 | Matic | G06K 9/00865 | 382/185 |
| 2011/0175917 A1 * | 7/2011 | Honda | G06F 17/276 | 345/468 |
| 2014/0163953 A1 * | 6/2014 | Parikh | G06F 17/276 | 704/9 |
| 2014/0363074 A1 * | 12/2014 | Dolfing | G06K 9/00979 | 382/156 |
| 2014/0365949 A1 * | 12/2014 | Xia | G06K 9/00436 | 715/780 |
| 2015/0222617 A1 * | 8/2015 | Ebersman | H04L 51/12 | 726/4 |

* cited by examiner

DETECTING LOGOGRAMS USING MULTIPLE INPUTS

FIELD

The subject matter disclosed herein relates to multiple inputs and more particularly relates to detecting logograms using the multiple inputs.

BACKGROUND

Description of the Related Art

Entering logograms, such as Chinese characters, certain Japanese characters (e.g., Kanji), certain Korean characters (e.g., Hanja), and the like, may be difficult because of the complexity of certain logograms and because of the large number of logograms.

BRIEF SUMMARY

An apparatus for detecting logograms using multiple inputs is disclosed. The apparatus includes a written input device, an audio input device, a processor, and a memory. The memory may store code executable by the processor to detect a sub-logogram from a written input to the written input device, detect a pronunciation from an audio input to the audio input device, and display one or more logogram hints in response to detecting the sub-logogram and the pronunciation. Each logogram hint of the one or more logogram hints includes the sub-logogram. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
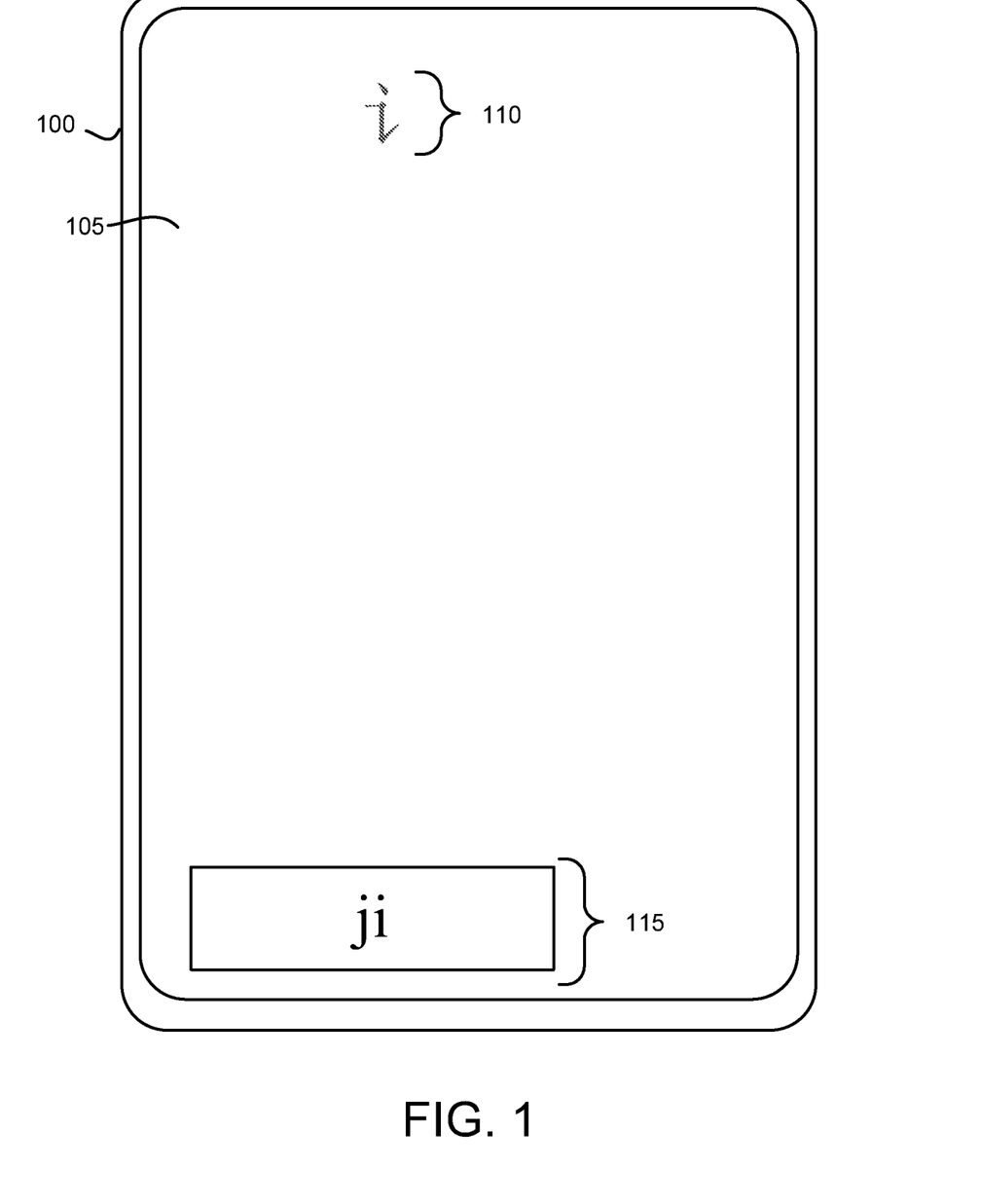
FIG. 1 is a drawing illustrating one embodiment of an electronic device.

FIG. 1 is a drawing illustrating one embodiment of an electronic device 100. In the depicted embodiment, the electronic device 100 is a written input device. In certain embodiments, the electronic device 100 may be a tablet computer, a mobile telephone, a laptop computer, a computer workstation, or the like. In one embodiment, the electronic device 100 includes a display 105.

The electronic device 100 is depicted as accepting written input 110. The written input 110 may be a sub-logogram, such as a portion of a logogram or a radical written by a user, or the like. In certain embodiments, the written input 110 may be a sub-logogram typed by the user. In the depicted embodiment, the written input 110 is a sub-logogram for the desired logograms that a user wishes to enter into the electronic device 100. Specifically, the written input 110 is the radical "讠" that is part of the desired Chinese logogram "讥." In some embodiments, the user may draw or type a sub-logogram that the user remembers to be a part of the desired logogram. The user may only input the sub-logogram rather than the desired logogram because of the complexity of certain logograms, the number of possible logograms, and/or the memory of the user. For example, the user may remember that the written input 110 "讠" is a sub-logogram of the desired logogram "讥." Accordingly, the user may draw or type the sub-logogram "讠."

The electronic device 100 may include an audio input device (e.g., microphone) used to receive audio input 115. The electronic device 100 is depicted as accepting the audio input 115. The audio input 115 may be a pronunciation of a desired logogram. In the depicted embodiment, the audio input 115 is a pronunciation for the desired logograms that a user wishes to enter into the electronic device 100. Specifically, the audio input 115 is the pinyin "ji" that is the pronunciation of the desired Chinese logogram "讥." However, as may be appreciated, the pronunciation of the desired Chinese logogram may be the pronunciation of multiple logograms. In certain embodiments, the pronunciation may be a pronunciation of a logogram with a similar meaning to the desired logogram, or the pronunciation may be a pronunciation of a logogram that is somehow related to the desired logogram.

In the past, when a user entered written input 110 that included only a portion of a desired logogram, the user might not be able to find the desired logogram. The embodiments described herein detect a sub-logogram from the written input 110 to the written input device (e.g., electronic device 100), detect a pronunciation from the audio input 115 to the audio input device, and display (e.g., on the display 105) one or more logogram hints in response to detecting the sub-logogram and the pronunciation. Each logogram hint of the one or more logogram hints includes the sub-logogram and the pronunciation.

Figure 2A:
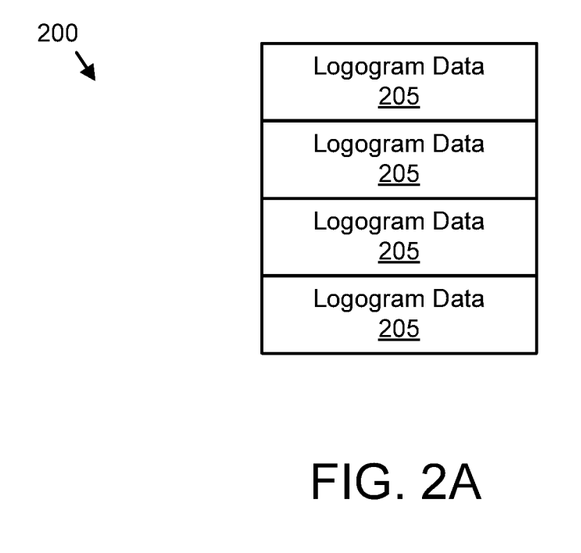
FIG. 2A is a schematic block diagram illustrating one embodiment of a logogram database.

FIG. 2A is a schematic block diagram illustrating one embodiment of a logogram database 200. The logogram database 200 may be organized as a data structure in a memory. The logogram database 200 may store logogram data 205 for multiple logograms.

Figure 2B:
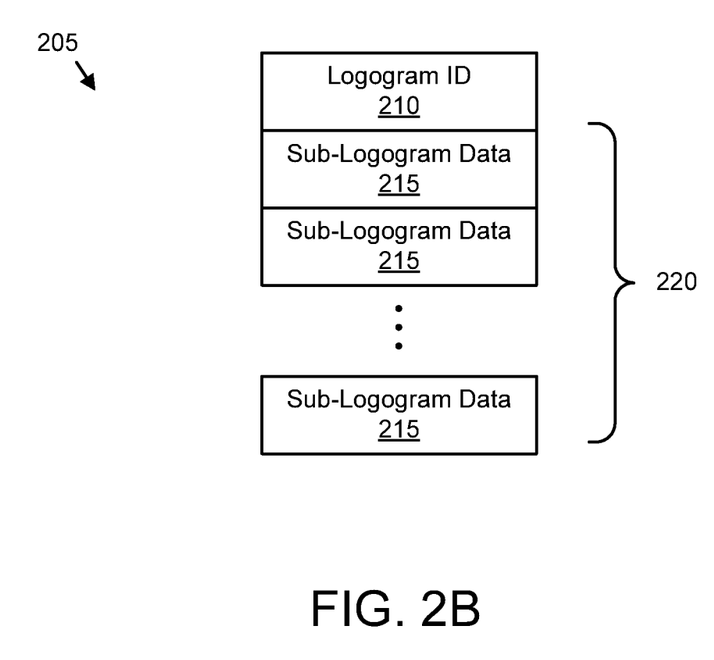
FIG. 2B is a schematic block diagram illustrating one embodiment of logogram data.

FIG. 2B is a schematic block diagram illustrating one embodiment of logogram data 205. The logogram data 205 may be organized as a data structure in the memory. The logogram data 205 may describe a given logogram. In the depicted embodiment, the logogram data 205 includes a logogram identifier 210 and sub-logogram data 215.

The logogram identifier 210 may uniquely identify a logogram. In one embodiment, the logogram identifier 210 is the Unicode value for the logogram. The sub-logograms data 215 includes data for possible sub-logograms that may be used to form the logogram. In certain embodiments, a set of sub-logograms 220 may include sub-logogram data 215 for multiple sub-logograms that may together be used to form the logogram. The set of sub-logograms 220 may include sub-logogram data 215 for any suitable number of sub-logograms, such as 2, 3, 4, 5, 6, 10, or more sub-logograms that may each be a portion of the logogram. In some embodiments, the set of sub-logograms 220 are ordered based on a proper order for writing the logogram. For example, the first sub-logogram data 215 may be the first sub-logogram that is written to render the logogram. In addition, the second sub-logogram data 215 may be the second sub-logogram that is written to render the logogram, and so forth.

Figure 2C:
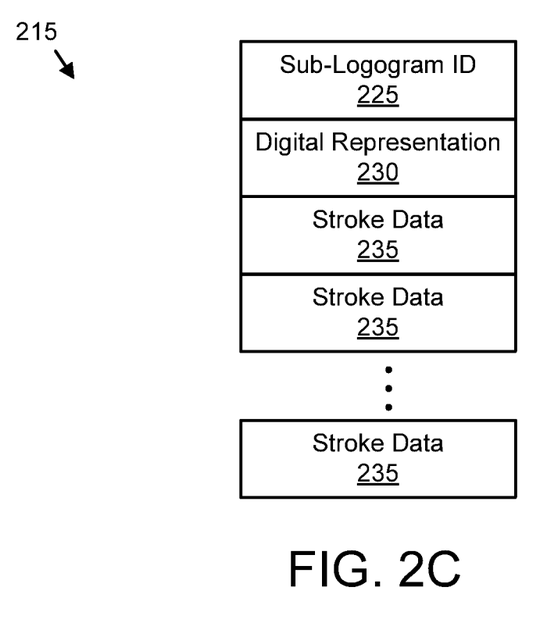
FIG. 2C is a schematic block diagram illustrating one embodiment of sub-logogram data.

FIG. 2C is a schematic block diagram illustrating one embodiment of the sub-logogram data 215. The sub-logogram data 215 may be organized as a data structure in the memory. The sub-logogram data 215 may describe a given sub-logogram. In the depicted embodiment, the sub-logogram data 215 includes a sub-logogram identifier 225, a digital representation 230, and stroke data 235.

The sub-logogram identifier 225 may uniquely identify a sub-logogram. In one embodiment, the sub-logogram identifier 225 is the Unicode value for the sub-logogram. In another embodiment, the sub-logogram identifier 225 is an assigned ID that is unique to the data structure. The digital representation 230 may be a digital value used to identify the sub-logogram. In some embodiments, the digital representation 230 is the Unicode value for the sub-logogram.

The stroke data 235 may describe one or more written strokes that render the logogram. For example, the sub-logogram data 215 may include one stroke data 235 entry for each stroke used to render the sub-logogram. Furthermore, each stroke data 235 may include a stroke number, a stroke direction, a stroke length, a stroke identifier, and the like. In certain embodiments, the stroke number may correspond with a sequence number of the respective stroke for producing a sub-logogram. For example, in an embodiment in which a sub-logogram is rendered using three strokes, there may be three stroke data 235 entries that correspond to the sub-logogram data 215 for the sub-logogram. In such an example, a first stroke data 235 entry that is to be drawn first for rendering the sub-logogram may have a stroke number of one which corresponds to its sequence number of one, a second stroke data 235 entry that is to be drawn second for rendering the sub-logogram may have a stroke number of two which corresponds to its sequence number of two, and a third stroke data 235 entry that is to be drawn third for rendering the sub-logogram may have a stroke number of three which corresponds to its sequence number of three. In some embodiments, the stroke data 235 may be ordered such that the first stroke data 235 is positioned in the sub-logogram data 215 first, the second stroke data 235 is positioned in the sub-logogram data 215 second, and the third stroke data 235 is positioned in the sub-logogram data 215 third.

Figure 3A:
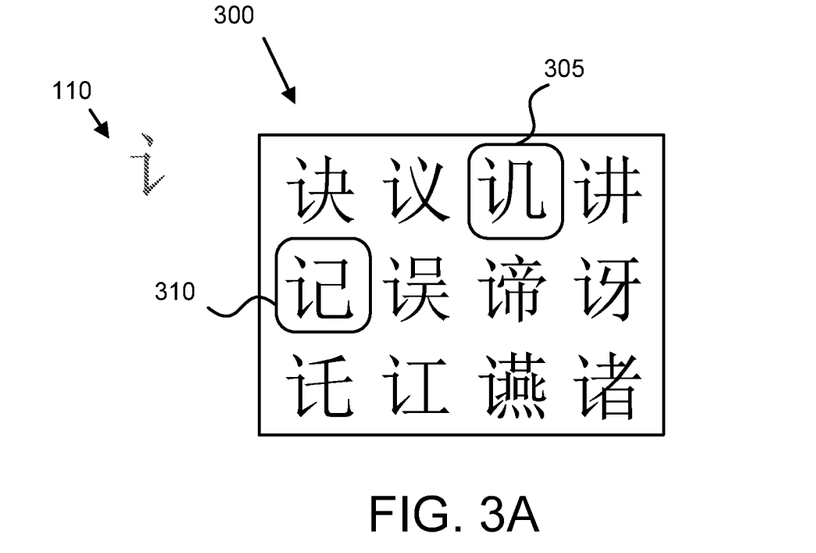
FIG. 3A is a drawing illustrating one embodiment of selecting a list of logograms.

FIG. 3A is a drawing illustrating one embodiment of selecting a list of logograms 300. In the depicted embodiment, a sub-logogram from the written input 110 "讠" to the written input device (e.g., electronic device 100) may be detected. For example, the written input device may detect the written input 110 "讠." In some embodiments, the written input device may determine a Unicode representation that corresponds to the written input 110 "讠." In such an embodiment, the Unicode representation for "讠" may be "8BA0." As may be appreciated, the Unicode representation "8BA0" may be stored in the logogram database 200. Specifically, the Unicode representation "8BA0" may be stored in the sub-logogram identifier 225 and/or the digital representation 230 portions of the sub-logogram data 215. Accordingly, the logogram database 200 may, in certain embodiments, be searched to identify sub-logogram data 215 that includes the Unicode representation "8BA0."

After the sub-logogram data 215 that includes the Unicode representation "8BA0" has been identified, the written input device may identify logogram data 205 that includes the sub-logogram data 215 having the Unicode representation "8BA0." As may be appreciated, one or more logogram data 205 may include the sub-logogram "亠" having the Unicode representation "8BA0." The one or more identified logogram data 205 that include the sub-logogram data 215 having the Unicode representation "8BA0" may be used to produce the list of logograms 300 by selecting the one or more identified logogram data 205. Accordingly, each logogram in the list of logograms 300 includes the sub-logogram from the written input 110. In certain embodiments, the list of logograms 300 may include a list of Unicode representations, with each Unicode representation representing a logogram. Although the list of logograms 300 is illustrated as being fairly short with 12 logograms, the actual list of logograms 300 that includes the sub-logogram from the written input 110 may include fewer or more logograms, such as 5, 15, 40, 70, 100, or more logograms. It should be noted that certain logograms in the list of logograms 300 may have the same or a substantially similar pronunciation. For example, logograms 305 and 310 may have the same or a substantially similar pronunciation (e.g., "ji"). Therefore, the list of logograms 300 may be reduced to a smaller number of logograms by filtering or limiting the list of logograms 300 to only include logograms having a desired pronunciation, as illustrated in FIG. 3C.

Figure 3B:
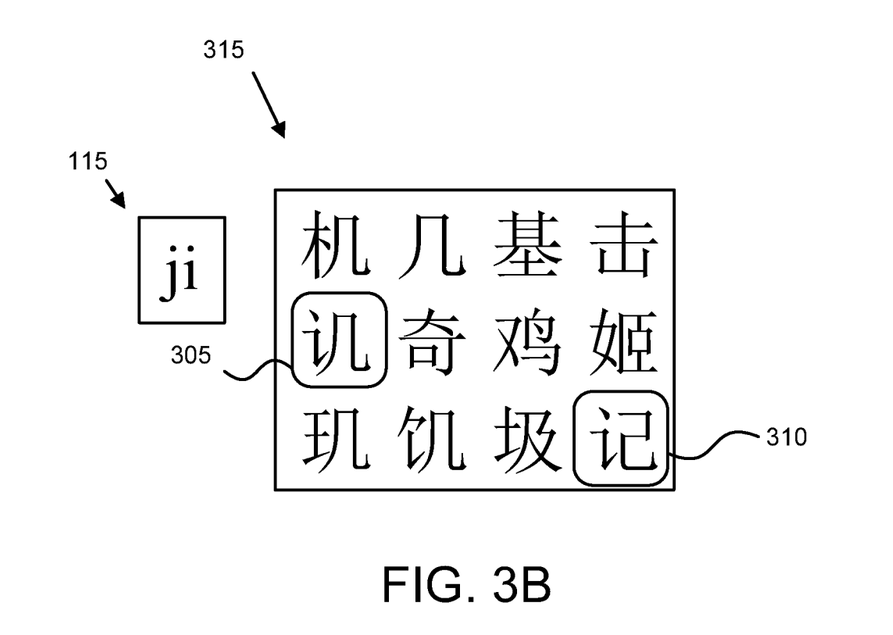
FIG. 3B is a drawing illustrating another embodiment of selecting a list of logograms.

FIG. 3B is a drawing illustrating another embodiment of selecting a list of logograms 315. In the depicted embodiment, a pronunciation from the audio input 115 "ji" to the audio input device may be detected. For example, the audio input device may detect the audio input 115 "ji." As may be appreciated, the pronunciation "ji" may be stored in the logogram database 200. Specifically, the pronunciation "ji" may be stored in the sub-logogram identifier 225 and/or the digital representation 230 portions of the sub-logogram data 215. Accordingly, the logogram database 200 may, in certain embodiments, be searched to identify sub-logogram data 215 that includes the pronunciation "ji."

After the sub-logogram data 215 that includes the pronunciation "ji" has been identified, logogram data 205 that includes the sub-logogram data 215 having the pronunciation "ji" may be identified. As may be appreciated, one or more logogram data 205 may have the pronunciation "ji" (e.g., the one or more logogram data 205 may be homonyms). The one or more identified logogram data 205 that include the sub-logogram data 215 having the pronunciation "ji" may be used to produce the list of logograms 315 by selecting the one or more identified logogram data 205. Accordingly, each logogram in the list of logograms 315 includes the pronunciation from the audio input 115 (e.g., each logogram is a homonym of the pronunciation). In certain embodiments, the list of logograms 315 may include a list of Unicode representations, with each Unicode representation representing a logogram. Although the list of logograms 315 is illustrated as being fairly short with 12 logograms, the actual list of logograms 315 that includes the pronunciation from the audio input 115 may include fewer or more logograms, such as 5, 15, 40, 70, 100, or more logograms. It should be noted that certain logograms in the list of logograms 315 may have sub-logograms that match. For example, logograms 305 and 310 each include a matching sub-logogram (e.g., "亠"). Therefore, the list of logograms 315 may be reduced to a smaller number of logograms by filtering or limiting the list of logograms 315 to only include logograms having a matching sub-logogram, as illustrated in FIG. 3C.

Figure 3C:
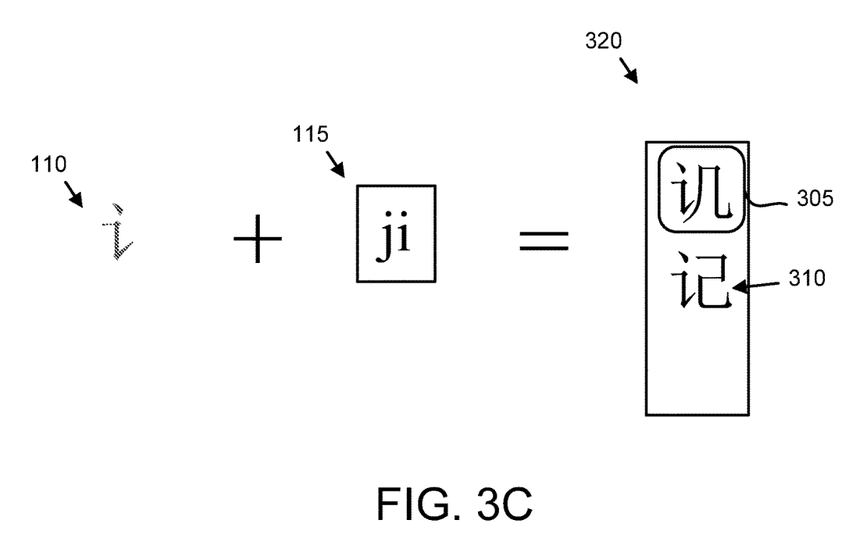
FIG. 3C is a drawing illustrating an embodiment of displaying one or more logogram hints.

FIG. 3C is a drawing illustrating an embodiment of displaying one or more logogram hints 320. As illustrated, the one or more logogram hints 320 includes only the logograms 305 and 310 that include both the sub-logogram "亠" from the written input 110 and the pronunciation "ji" from the audio input 115. Accordingly a desired logogram may be selected from a limited set of logograms thereby enabling quicker selection of a desired logogram.

The one or more logogram hints 320 may be selected for display using any suitable selection technique. In one embodiment, a list of logograms 300 may be selected such that each logogram of the list of logograms 300 includes the sub-logogram from the written input 110. The one or more logogram hints 320 may be selected directly from the list of logograms 300 by selecting logograms from the list of logograms 300 that have the pronunciation from the audio input 115.

In another embodiment, a list of logograms 315 may be selected such that each logogram of the list of logograms 315 includes the pronunciation from the audio input 115. The one or more logogram hints 320 may be selected directly from the list of logograms 315 by selecting logograms from the list of logograms 315 that have the sub-logogram from the written input 110.

In a further embodiment, a list of logograms 300 may be selected such that each logogram of the list of logograms 300 includes the sub-logogram from the written input 110. Moreover, a list of logograms 315 may be selected such that each logogram of the list of logograms 315 includes the pronunciation from the audio input 115. The one or more logograms hints 320 may be selected by identifying the matches between the lists of logograms 300 and 315. As may be appreciated, the matches may be identified by comparing Unicode representations, string comparisons, database identification, logogram IDs 210, and so forth. It should be noted that by using a combination of the written input 110 and the audio input 115, the one or more logograms hints 320 may be displayed and/or provided to a user quickly and with a limited number of logogram hints to select from thereby enabling a user to quickly select a desired logogram. In certain embodiments, the one or more logogram hints 320 may be reduced by narrowing the list to include only logograms that are proper for a context in which a target logogram is to be used.

Figure 4:
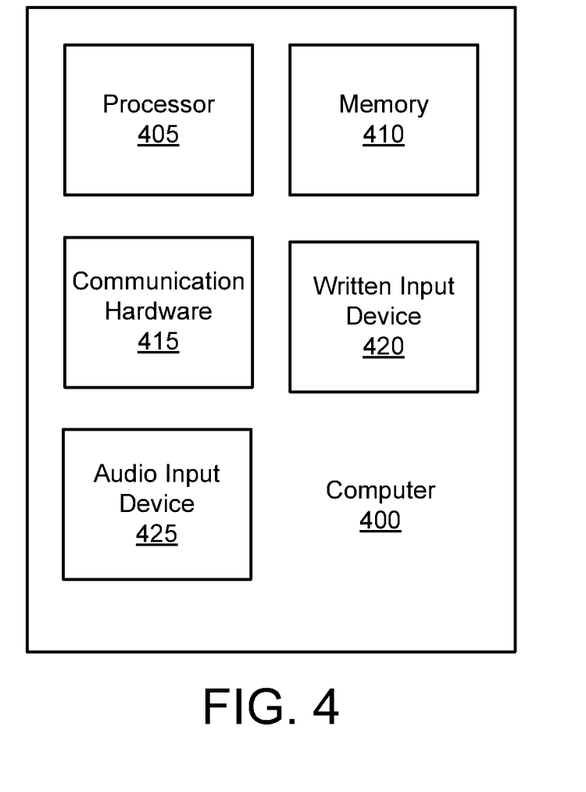
FIG. 4 is a schematic block diagram illustrating one embodiment of a computer.

FIG. 4 is a schematic block diagram illustrating one embodiment of a computer 400. The computer 400 may be embodied in the electronic device 100. Alternatively, the computer 400 may be embodied in a server in communication with the electronic device 400. In the depicted embodiment, the computer 400 includes a processor 405, a memory 410, communication hardware 415, a written input device 420, and an audio input device 425. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. The written input device 420 may be any device suitable to receiving written input, such as a touchscreen, a mouse, a keyboard, a stylus, and so forth. Moreover, the audio input device 425 may be any suitable device for receiving audio input, such as a microphone, a transducer, and so forth.

Figure 5:
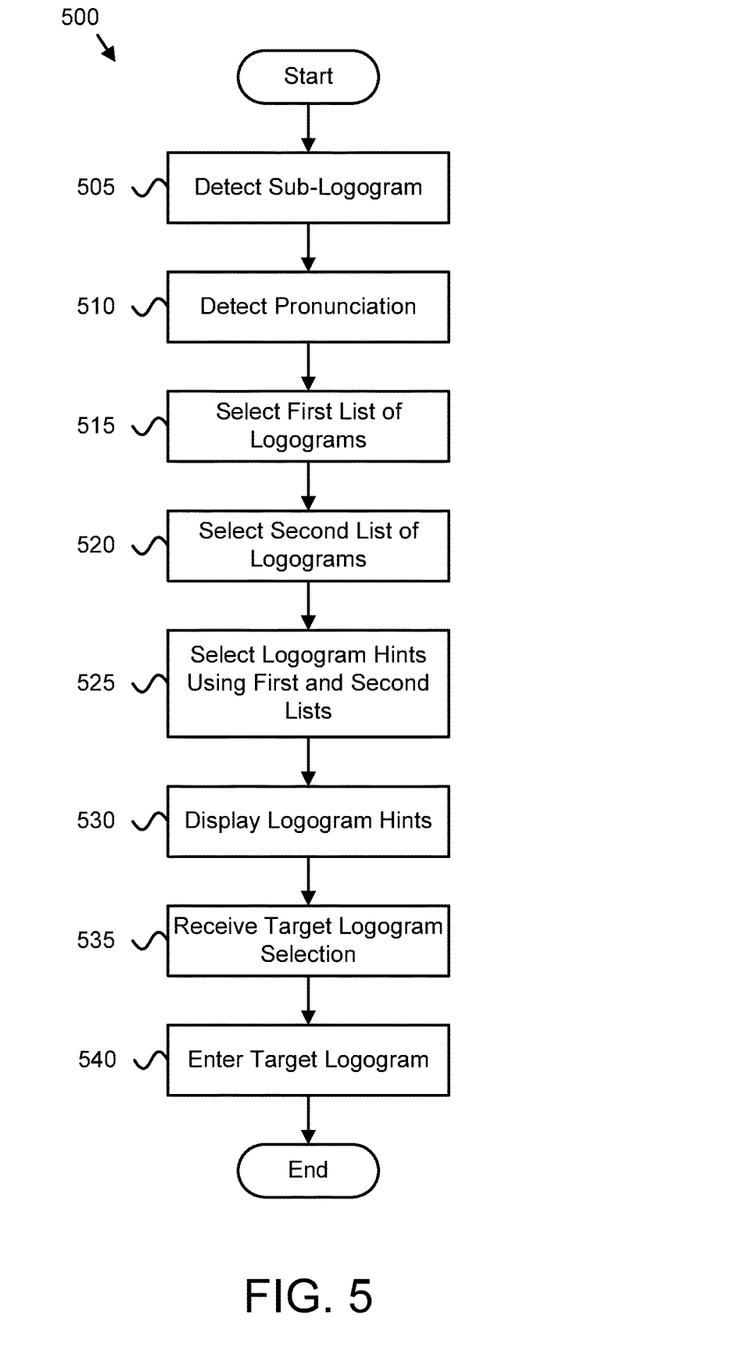
FIG. 5 is a schematic flow chart diagram illustrating one embodiment of a method that detects logograms using multiple inputs.

FIG. 5 is a schematic flow chart diagram illustrating one embodiment of a method 500 that detects logograms using multiple inputs. The method 500 may be performed by the processor 405. Alternatively, the method 500 may be performed by computer readable storage medium such as the memory 410. The computer readable storage medium may store code that is executable by the processor 405 to perform the functions of the method 500.

The method 500 starts, and in one embodiment, the method 500 detects 505 a sub-logogram from a written input (e.g., written input 110) to a written input device. In certain embodiments, the written input device may be the electronic device 100. As may be appreciated, the method 500 may detect 505 the sub-logogram by comparing the written input to the sub-logogram data 215 stored in the logogram database 200. Moreover, in some embodiments, the processor 405 of the computer 400 may be used to detect 505 the sub-logogram. The sub-logogram may include one or more of a Unicode representation and one or more strokes. In some embodiments, the sub-logogram may include a radical. The method 500 may further detect 510 a pronunciation from an audio input (e.g., audio input 115) to an audio input device (e.g., audio input device 425). As may be appreciated, the method 500 may detect 510 the pronunciation by comparing the audio input to the logogram data 205 stored in the logogram database 200. Moreover, in some embodiments, the processor 405 of the computer 400 may be used to detect 510 the pronunciation.

In one embodiment, the method 500 selects 515 a first list of logograms (e.g., list of logograms 300). In the first list of logograms, each logogram may include the sub-logogram. In some embodiments, the processor 405 of the computer 400 may be used to select 515 the first list of logograms. In certain embodiments, the first list of logograms includes a first list of Unicode representations. In various embodiments, the method 500 selects 520 a second list of logograms (e.g., list of logograms 315). In the second list of logograms, each logogram may include the pronunciation. In some embodiments, the processor 405 of the computer 400 may be used to select 520 the second list of logograms. In certain embodiments, the second list of logograms includes a second list of Unicode representations.

In some embodiments, the method 500 selects 525 one or more logogram hints (e.g., one or more logogram hints 320) using the first and second lists of logograms. For example, the method 500 may select 525 the one or more logogram hints by selecting logograms that are in both of the first and second lists of logograms. In one embodiment, the method 500 may include selecting logograms that are in both of the first and second lists of logograms by selecting a list of Unicode representations that includes Unicode representations that are in both of the first and second lists of logograms. In various embodiments, the processor 405 of the computer 400 may be used to select 525 the one or more logogram hints using the first and second lists of logograms.

The method 500 may display 530 the one or more logogram hints in response to detecting 505 the sub-logogram and detecting 510 the pronunciation. For example, the method 500 may display 530 the one or more logogram hints on the display 105 of the electronic device 100. In some embodiments, there may be only one logogram hint, while in other embodiments there may be two or more logogram hints. Each logogram hint of the one or more logogram hints includes the sub-logogram and the pronunciation. The method 500 may receive 535 a target logogram selection that is selected from the one or more logogram hints. The method 500 may enter 540 the target logogram. For example, the method 500 may enter 540 the target logogram into a document being written by a user, then the method 500 may end.

Figure 6:
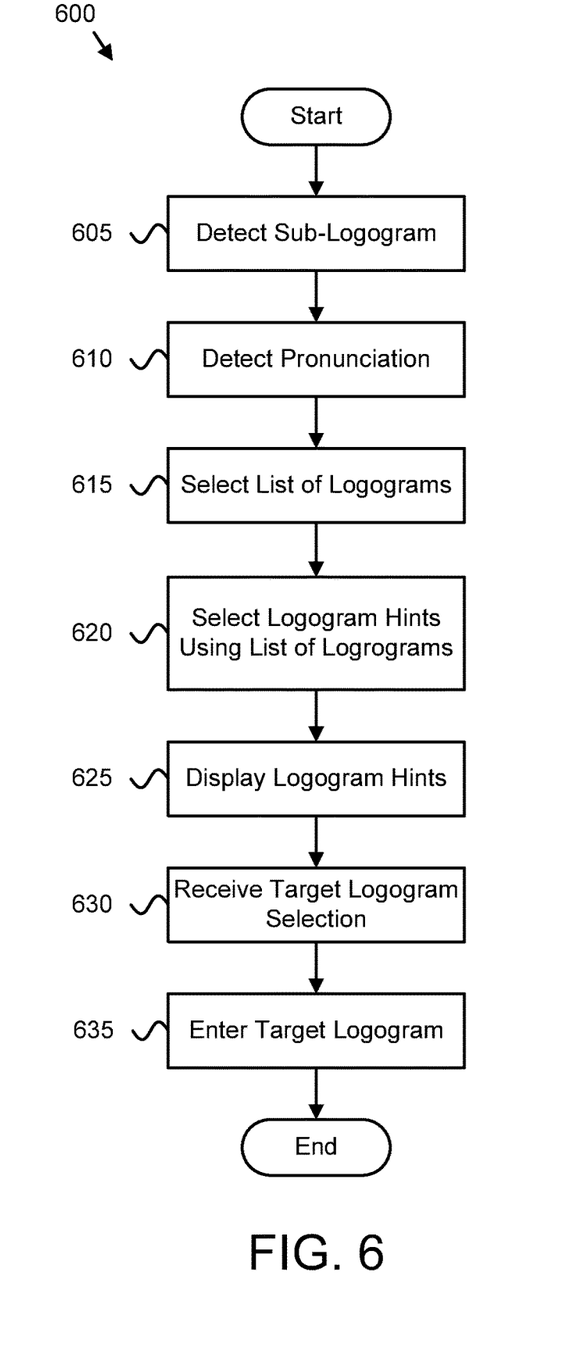
FIG. 6 is a schematic flow chart diagram illustrating another embodiment of a method that detects logograms using multiple inputs.

FIG. 6 is a schematic flow chart diagram illustrating another embodiment of a method 600 that detects logograms using multiple inputs. The method 600 may be performed by the processor 405. Alternatively, the method 600 may be performed by computer readable storage medium such as the memory 410. The computer readable storage medium may store code that is executable by the processor 405 to perform the functions of the method 600.

The method 600 starts, and in one embodiment, the method 600 detects 605 a sub-logogram from a written input (e.g., written input 110) to a written input device. In certain embodiments, the written input device may be the electronic device 100. As may be appreciated, the method 600 may detect 605 the sub-logogram by comparing the written input to the sub-logogram data 215 stored in the logogram database 200. Moreover, in some embodiments, the processor 405 of the computer 400 may be used to detect 605 the sub-logogram. The sub-logogram may include one or more of a Unicode representation and one or more strokes. In some embodiments, the sub-logogram may include a radical. The method 600 may further detect 610 a pronunciation from an audio input (e.g., audio input 115) to an audio input device (e.g., audio input device 425). As may be appreciated, the method 600 may detect 610 the pronunciation by comparing the audio input to the logogram data 205 stored in the logogram database 200. Moreover, in some embodiments, the processor 405 of the computer 400 may be used to detect 610 the pronunciation.

In one embodiment, the method 600 selects 615 a list of logograms (e.g., list of logograms 300, list of logograms 315). In the list of logograms, each logogram may include the sub-logogram, or each logogram may include the pronunciation. In some embodiments, the processor 405 of the computer 400 may be used to select 615 the list of logograms. In certain embodiments, the list of logograms includes a list of Unicode representations.

In some embodiments, the method 600 selects 620 one or more logogram hints (e.g., one or more logogram hints 320) using the list of logograms. For example, in an embodiment in which each logogram of the list of logograms includes the sub-logogram, the method 600 may select 620 the one or more logogram hints by selecting logograms from the list of logograms that include the pronunciation. In another example, in an embodiment in which each logogram of the list of logograms includes the pronunciation, the method 600 may select 620 the one or more logogram hints by selecting logograms from the list of logograms that include the sub-logogram. In various embodiments, the processor 405 of the computer 400 may be used to select 620 the one or more logogram hints using the list of logograms.

The method 600 may display 625 the one or more logogram hints in response to detecting 605 the sub-logogram and detecting 610 the pronunciation. For example, the method 600 may display 625 the one or more logogram hints on the display 105 of the electronic device 100. In some embodiments, there may be only one logogram hint, while in other embodiments there may be two or more logogram hints. Each logogram hint of the one or more logogram hints includes the sub-logogram and the pronunciation. The method 600 may receive 630 a target logogram selection that is selected from the one or more logogram hints. The method 600 may enter 635 the target logogram. For example, the method 600 may enter 635 the target logogram into a document being written by a user, then the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a written input device;
an audio input device;
a processor;
a memory that stores code executable by the processor to:
 detect a sub-logogram from a written input to the written input device;
 select a first list of logograms, wherein each logogram of the first list of logograms comprises the sub-logogram, and the first list of logograms comprises a Unicode representation for each logogram of the first list of logograms;
 detect a pronunciation from an audio input to the audio input device;
 select a second list of logograms, wherein each logogram of the second list of logograms comprises the pronunciation, and the second list of logograms comprises a Unicode representation for each logogram of the second list of logograms;
 select one or more logogram hints by selecting a list of Unicode representations that includes Unicode representations that are in both of the first and second lists of logograms; and
 display the one or more logogram hints to display a limited number of logogram hints to enable a user to quickly select a desired logogram, wherein each logogram hint of the one or more logogram hints comprises the sub-logogram.

2. The apparatus of claim 1, wherein each logogram hint of the one or more logogram hints comprises the pronunciation.

3. The apparatus of claim 1, wherein the memory further comprises code executable by the processor to select the one or more logograms by selecting the second list of logograms from the first list of logograms.

4. The apparatus of claim 1, wherein the memory further comprises code executable by the processor to select the one or more logograms by selecting the first list of logograms from the second list of logograms.

5. The apparatus of claim 1, wherein the memory further comprises code executable by the processor to select the one or more logogram hints by selecting logograms that are in both of the first list of logograms and the second list of logograms.

6. The apparatus of claim 1, wherein the sub-logogram comprises a radical.

7. A method comprising:
detecting, by use of a processor, a sub-logogram from a written input;
selecting a first list of logograms, wherein each logogram of the first list of logograms comprises the sub-logogram, and the first list of logograms comprises a Unicode representation for each logogram of the first list of logograms;
detecting a pronunciation from an audio input;
selecting a second list of logograms, wherein each logogram of the second list of logograms comprises the pronunciation, and the second list of logograms comprises a Unicode representation for each logogram of the second list of logograms;
selecting one or more logogram hints by selecting a list of Unicode representations that includes Unicode representations that are in both of the first and second lists of logograms; and
displaying the one or more logogram hints to display a limited number of logogram hints to enable a user to quickly select a desired logogram, wherein each logogram hint of the one or more logogram hints comprises the sub-logogram.

8. The method of claim 7, wherein each logogram hint of the one or more logogram hints comprises the pronunciation.

9. The method of claim 7, further comprising detecting a context of a target logogram and each logogram hint of the one or more logogram hints matches the context of the target logogram.

10. The method of claim 7, further comprising receiving a selection of a target logogram from the one or more logogram hints.

11. The method of claim 7, further comprising selecting the one or more logograms by selecting the second list of logograms from the first list of logograms.

12. The method of claim 7, further comprising selecting the one or more logograms by selecting the first list of logograms from the second list of logograms.

13. The method of claim 7, further comprising selecting the one or more logogram hints by selecting logograms that are in both of the first list of logograms and the second list of logograms.

14. A program product comprising a non-transitory computer readable storage medium that stores code executable by a processor, the executable code comprising code to perform:
detecting a sub-logogram from a written input;
selecting a first list of logograms, wherein each logogram of the first list of logograms comprises the sub-logogram, and the first list of logograms comprises a Unicode representation for each logogram of the first list of logograms;
detecting a pronunciation from an audio input;
selecting a second list of logograms, wherein each logogram of the second list of logograms comprises the pronunciation, and the second list of logograms comprises a Unicode representation for each logogram of the second list of logograms;
selecting one or more logogram hints by selecting a list of Unicode representations that includes Unicode representations that are in both of the first and second lists of logograms; and
displaying the one or more logogram hints to display a limited number of logogram hints to enable a user to quickly select a desired logogram, wherein each logogram hint of the one or more logogram hints comprises the sub-logogram.

* * * * *